United States Patent [15] 3,674,872
Rheiner, Jr. et al. [45] July 4, 1972

[54] ANTIMALARIAL COMPOSITIONS

[72] Inventors: Alfred Rheiner, Jr., Basel, Switzerland; Michel Fernex, Durmenach, France; Jose Herrero, Basel, Switzerland

[73] Assignee: Hoffman-La Roche Inc., Nutley, N.J.

[22] Filed: Sept. 29, 1970

[21] Appl. No.: 76,593

Related U.S. Application Data

[63] Continuation-in-part of Ser. No. 791,518, Jan. 15, 1969, abandoned.

[52] U.S. Cl. ............................................. 424/229, 424/326
[51] Int. Cl. ........................................................ A61k 27/00
[58] Field of Search ......................................... 424/229, 326

[56] References Cited

OTHER PUBLICATIONS

Chemical Abstracts 66: 36362w (1967)
The Merck Index of Chemicals and Drugs, 7th Edition, 1960, Merck and Co., Inc., page 236

Primary Examiner—Jerome D. Goldberg
Attorney—Samuel L. Welt, Jon S. Saxe, Bernard S. Leon, Gerald S. Rosen, R. Hain Swope and William M. Farley

[57] ABSTRACT

Antimalarial compositions comprising sulfadimethoxine [N'-(2,6-dimethoxy-4-pyrimidinyl)-sulfanilamide] and proguanil [1-(p-chlorophenyl)-5-isopropyl-biguanide] or their salts are described.

8 Claims, No Drawings

ANTIMALARIAL COMPOSITIONS

RELATED APPLICATIONS

This application is a continuation-in-part of U. S. Pat. application Ser. No. 791,518 filed Jan. 15, 1969 now abandoned.

SUMMARY OF THE INVENTION

The present invention relates to a novel composition for the treatment of malaria. More particularly, the present invention relates to a combination of sulfadimethoxine [N'-(2,6-dimethoxy-4-pyrimidinyl)-sulfanilamide] or its pharmaceutically acceptable salts and proguanil [1-(p-chlorophenyl)-5-isopropyl-biguanide] or its pharmaceutically acceptable salts. The novel compositions of the present invention have unexpectedly been found to possess a synergistic action in the therapeutic treatment of malaria.

DETAILED DESCRIPTION

The therapeutically active combinations of compounds which comprise the novel antimalarial compositions of the present invention may be compounded in admixture with suitable organic and inorganic pharmaceutical carrier materials. The compositions may be formulated into the commonly utilized dosage forms suitable for oral, rectal or parenteral application. The oral preparations which, in the treatment of malaria, are utilized mainly for prophylaxis (suppressive treatment) may be in either solid or liquid form. Suitable solid forms include tablets, dragees, suppositories and capsules. Liquid forms include solutions, suspensions and emulsions. Representative carrier materials which may be utilized in the formulation and compounding of oral and parenteral dosage forms include starches, lactose, magnesium stearate, talc, vegetable oils, organic solubilizers such as polyalkylene glycol or glycerine formal, organic and inorganic bases and water. The dosage forms may be sterilized and/or contain additives such as preserving, stabilizing, wetting or emulsifying agents, salts for varying the osmotic pressure or buffers. They may also contain additional therapeutically valuable substances.

The active ingredients of the present invention may be utilized in the form of their pharmaceutically acceptable salts for purposes of solubilization, compounding ease and the like as recognized in the art. Suitable salts of proguanil include acid addition salts with pharmaceutically acceptable inorganic and organic acids. Representative acids suitable for the formation of such salts include hydrochloric acid, hydrobromic acid, sulfuric acid, phosphoric acid, acetic acid, malic acid, fumaric acid, glutamic acid, tartaric acid, citric acid, lactic acid and the like. Suitable salts of sulfadimethoxine include those with pharmaceutically acceptable inorganic bases such as the alkali and alkaline earth metal salts and pharmaceutically acceptable organic bases such as diethanolamine and the like.

The therapeutically active compositions of the present invention are therapeutically useful and exhibit synergistic activity in the treatment of malaria caused by those organisms generally considered to be susceptible to therapy with proguanil. This group of organisms includes, for example, *Plasmodium berghei* (experimental malaria in the mouse), *Plasmodium malariae* and *Plasmodium falciparum*. The compositions of the present invention, as in the case with proguanil, are ineffective in treating malaria caused by *Plasmodium vivax*.

The mutually potentiating activity of the therapeutically active combination of ingredients of the present invention may be readily demonstrated experimentally in mice which have been infected with *Plasmodium berghei*.

Groups of 10 animals received various doses of active substances as indicated in Table I. Groups of mice received no medication (control), sulfadimethoxine and proguanil alone in several strengths and in various combinations within the scope of the compositions as claimed herein. In the case of administration of the two active substances, they were injected separately at different sites within an interval of a few minutes. The administration of actice drug or combination was followed with intraperitoneal administration of $10^7$ mouse erythrocytes of *Plasmodium berghei* (Strain NYK 65) per animal. On each of the following three days, each animal was treated once daily by subcutaneous administration of the initial dose of active substance. On the fifth day, the infected erythrocytes in the blood smear were counted. The erythrocyte infection rate (EIR) of the treated animals was compared to that of the infected but untreated controls.

The degrees of infection with different doses of the active substance in percent as compared to the control group degree of infection, which is established as 100 percent, are set out in Table I.

TABLE I

The results below reflect the degree of infection with different doses of sulfadimethoxine and proguanil individually and in combinations as compared to an infected control receiving no medication, expressed as 100 percent (average erythrocyte infection rate of the control animals is 33 percent).

Dosage: Subcutaneously daily for 4 days

| mg/kg | Proguanil Hydrochloride | | | | |
|---|---|---|---|---|---|
| | 0 | 1 | 3 | 10 | 30 |
| Sulfadimethoxine (as the sodium salt) | | | | | |
| 0 | 100 | 95 | 100 | 53 | 37 |
| 0.03 | 91 | 99 | 95 | 47 | 6.2 |
| 0.1 | 92 | 84 | 73 | 19 | 7.8 |
| 0.3 | 86 | 77 | 57 | 32 | 1.0 |
| 1.0 | 62 | 63 | 31 | 10 | 3.2 |

Table II establishes the $ED_{50}$ and $ED_{90}$ of the sulfadimethoxine-proguanil combination. Dosage in all instances was administered subcutaneously daily for four successive days.

TABLE II $ED_{50}$ (mg/kg)

| Sulfadimethoxine (as the sodium salt) | + | Proguanil Hydrochloride |
|---|---|---|
| 0 | | 35* |
| 0.01 | | 30 |
| 0.025 | | 10 |
| 0.03 | | 7.8 |
| 0.10 | | 5.8 |
| 0.30 | | 3.5 |
| 0.37 | | 3.0 |
| 1.00 | | 1.7 |
| 1.30 | | 1.0 |
| 1.40* | | 0 |

*Extrapolated value

From this table it can be seen that a combination of 1.0 mg. of sulfadimethoxine and 1.7 mg. of proguanil hydrochloride or 0.37 mg. sulfadimethoxine and 3.0 mg. of proguanil hydrochloride per kg. of mouse weight is equal in activity to 1.4 mg/kg sulfadimethoxine or 35 mg/kg proguanil hydrochloride administered alone.

Table III represents results of treatment of 120 children in Western Cameroun. These 120 children, ages 6 to 9 years, were selected from 900 children as showing the highest degree of parasitemia. The children were treated with proguanil alone and with two different combinations of proguanil and sulfadimethoxine. Dosage was orally by tablet and administration was daily for 5 days. The children were clinically and parasitologically checked daily after starting medication.

There were two cases observed among those children treated with proguanil alone which showed no reaction towards medication. The existence of proguanil-resistant strains of Plasmodium is, therefore, established in Western Cameroun. All other cases showed distinctive response to treatment, e.g., the parasitemia disappeared completely or at least for a certain period. In the latter case, the reappearance of the parasites in the blood was characterized by the observation of a small number of trophozoites (about 10/mm$^3$). From Table III it is evident that the disappearance of the *Plasmodium falciparum*-trophozoites and *Plasmodium malariae*-trophozoites from the blood was more rapid when the combination of proguanil and sulfadimethoxine was utilized than with proguanil alone. Neither proguanil nor the combination of proguanil with sulfadimethoxine had an activity toward the gametes. Compatability in all cases was excellent.

TABLE III

[Number of positive cases (trophozoites in blood)]

| Treatment (daily dose) | Indication | Before treatment | Days after starting treatment | | | |
|---|---|---|---|---|---|---|
| | | | 2d day | 3d day | 4th day | 5th day |
| Proguanil (25 mg.)[1] | *P. falciparum* (gametes) | 40 (9) | 39 (21) | 13 (21) | 4 (18) | 3 (17) |
| | *P. malariae* (gametes) | 6 (5) | 9 (9) | 3 (5) | 1 (5) | 0 (5) |
| Proguanil (25 mg.) plus sulfadimethoxine (12.5 mg.)[1] | *P. falciparum* (gametes) | 40 (17) | 40 (13) | 0 (13) | 0 (15) | 0 (16) |
| | *P. malariae* (gametes) | 13 (11) | 10 (11) | 0 (11) | 0 (11) | 0 (9) |
| Proguanil (25 mg.) plus sulfadimethoxine (50 mg.)[1] | *P. falciparum* (gametes) | 40 (25) | 33 (23) | 1 (21) | 2 (23) | 1 (24) |
| | *P. malariae* (gametes) | 5 (5) | 3 (1) | 0 (2) | 0 (2) | 0 (1) |

[1] 40 children.

Table IV represents the results of a further study with 61 children which were divided into 4 groups. These children were treated with proguanil and sulfadimethoxine alone and in two different combinations. The dosage was administered in all instances by a single tablet *per os* per day for 5 days. From Table IV it is again evident that the disappearance of *Plasmodium falciparum* trophozoites from the blood was more rapid with the combination of proguanil and sulfadimethoxine than with either drug administered alone.

TABLE IV. NUMBER OF CURED CASES

[Disappearance of plasmodium falciparum trophozoites from the blood]

| Daily oral dosage (single treatment) | Indication | Days after starting treatment | | | | | Cases not deparasitized |
|---|---|---|---|---|---|---|---|
| | | 1 | 2 | 3 | 4 | 5 | |
| Proguanil 50 mg. (5 mg./kg.) 10 children. | *P. falciparum* | | 2 | 5 | 1 | 1 | 1 |
| Sulfadimethoxine 200 mg. (20 mg./kg.) 10 children. | do | | 2 | 3 | 3 | 1 | 1 |
| Proguanil 50 mg. plus sulfadimethoxine 25 mg. (5+2, 5 mg./kg.) 20 children. | do | | 2 | 16 | 1 | | 1 |
| Proguanil 50 mg. plus sulfadimethoxine 100 mg. (5+10 mg./kg.) 21 children. | do | | 13 | 7 | 1 | | |

In the case of daily administration, the dose for an adult is between 50 mg. and 400 mg. of the combination, and preferably between 200 and 300 mg. The dosage for a child is proportionately less as is recognized in the art. The range of ratio of sulfadimethoxine to either proguanil or cycloguanil can be from 1:10 parts by weight to 10:1 parts by weight. The preferred range is between 1:2 parts by weight to 2:1 parts by weight. The dosage may be increased where an injectable form is utilized for therapeutic purposes, or if a weekly dosage is to be given in a single administration. In these instances, the dosage may be from 500 to 2,500 mg. of the combination.

As has been stated, the therapeutically active compositions of the present invention may be administered in any pharmaceutically acceptable dosage form suitable for the systemic, i.e., oral, parenteral or rectal administration of medication. It is most preferred to administer the compositions of the present invention in the form of tablets for oral administration. Such tablets contain, optimally either 25 mg. or 100 mg. of sulfadimethoxine or the equivalent amount of a salt thereof with a pharmaceutically acceptable base and 50 mg. of proguanil or the equivalent amount of a salt thereof with a pharmaceutically acceptable acid.

Representative methods of incorporating the novel compositions of the present invention into therapeutically useful dosage forms are illustrated by the following examples.

EXAMPLE 1

Tablets of the following representative compositions were manufactured:

(a) 
| Sulfadimethoxine | 100 mg. |
|---|---|
| Proguanil hydrochloride | 50 mg. |
| Corn Starch | 378 mg. |
| Lactose | 70 mg. |
| Magnesium Stearate | 2 mg. |
| Total: | 600 mg. |

(b)
| Sulfadimethoxine | 25 mg. |
|---|---|
| Proguanil hydrochloride | 50 mg. |
| Corn Starch | 453 mg. |
| Lactose | 70 mg. |
| Magnesium Stearate | 2 mg. |
| Total: | 600 mg. |

The sulfadimethoxine, proguanil and part of the other ingredients were granulated with a corn starch paste. After drying, a powder of corn starch and magnesium stearate was added and the whole mixed and pressed to tablets of 13 mm thickness, 600 mg. weight and a hardness of 6 to 8 SCU utilizing a conventional tabletting machine.

EXAMPLE 2

A solution was prepared from the following ingredients:

| Sulfadimethoxine | 500 mg. |
|---|---|
| Proguanil | 100 mg. |
| Glycerine formal | 0.5 cc |
| Diethanolamine | 0.076 cc |
| Water | 0.5 cc | and filtered. The solution was formed into injectable preparations by being treated with a preservative and filled into ampules in an inert atmosphere. As an alternative, part of the solution was filled into ampules under an inert gas and sterilized.

We claim:

1. A composition therapeutically useful in the treatment of malaria caused by organisms sensitive to 1-(p-chlorophenyl)-5-isopropyl-biguanide which comprises a therapeutically inert, pharmaceutically acceptable carrier material suitable for the oral, parenteral or rectal administration of medication and an anti-malarially effective amount of an active ingredient consisting essentially of:

a. N'-(2,6-dimethoxy-4-pyrimidinyl)-sulfanilamide or a salt thereof with a pharmaceutically acceptable base; and b. 1-(p-chlorophenyl)-5-isopropyl-biguanide or a salt thereof with a pharmaceutically acceptable acid, said Component (a) being present in from about 0.5 to 2.0 parts by weight for each part by weight of said Component (b).

2. The therapeutic composition in accordance with claim 1 in the form of tablets for oral administration, each such tablet containing about 25 mg. of N'-(2,6-dimethoxy-4-pyrimidinyl)-sulfanilamide or the equivalent amount of a salt thereof with a pharmaceutically acceptable base and about 50 mg. of 1-(p-chlorophenyl)-5-isopropyl-biguanide or the equivalent amount of a salt thereof with a pharmaceutically acceptable acid.

3. The therapeutic composition in accordance with claim 1 in the form of tablets for oral administration, each such tablet containing about 100 mg. N'-(2,6-dimethoxy-4-pyrimidinyl)-sulfanilamide or the equivalent amount of a salt thereof with a pharmaceutically acceptable base and about 50 mg. of 1-(p-chlorophenyl)-5-isopropyl-biguanide or the equivalent amount of a salt thereof with a pharmaceutically acceptable acid.

4. The therapeutic composition in accordance with claim 1 wherein said salt of N'-(2,6-dimethoxy-4-pyrimidinyl)-sulfanilamide with a pharmaceutically acceptable base is the sodium salt and said salt of 1-(p-chlorophenyl)-5-isopropyl-biguanide with a pharmaceutically acceptable acid is the hydrochloride.

5. A method for the therapeutic treatment of malaria caused by organisms sensitive to 1-(p-chlorophenyl)-5-isopropyl-biguanide which comprises the administration to a human host of an anti-malarially effective amount of a therapeutic composition which comprises a therapeutically inert, pharmaceutically acceptable carrier material suitable for the oral, parenteral or rectal administration of medication and an active ingredient consisting essentially of:
   a. N'-(2,6-dimethoxy-4-pyrimidinyl)-sulfanilamide or a salt thereof with a pharmaceutically acceptable base; and
   b. 1-(p-chlorophenyl)-5-isopropyl-biguanide or a salt thereof with a pharmaceutically acceptable acid, said Component (a) being present in from about 0.5 to 2.0 parts by weight for each part by weight of said Component (b).

6. The method in accordance with claim 5 wherein said therapeutic composition is administered orally in the form of tablets each such tablet containing about 25 mg. of N'-(2,6-dimethoxy-4-pyrimidinyl)-sulfanilamide or the equivalent amount of a salt thereof with a pharmaceutically acceptable base and about 50 mg. of 1-(p-chlorophenyl)-5-isopropyl-biguanide or the equivalent amount of a salt thereof with a pharmaceutically acceptable acid.

7. The method in accordance with claim 5 wherein said therapeutic composition is administered orally in the form of tablets each such tablet containing about 100 mg. N'-(2,6-dimethoxy-4-pyrimidinyl)-sulfanilamide or the equivalent amount of a salt thereof with a pharmaceutically acceptable base and about 50 mg. of 1-(p-chlorophenyl)-5-isopropyl-biguanide or the equivalent amount of a salt thereof with a pharmaceutically acceptable acid.

8. The method in accordance with claim 5 wherein said salt of N'-(2,6-dimethoxy-4-pyrimidinyl)-sulfanilamide with a pharmaceutically acceptable base is the sodium salt and said salt of 1-(p-chlorophenyl)-5-isopropyl-biguanide with a pharmaceutically acceptable acid is the hydrochloride.

* * * * *

UNITED STATES PATENT OFFICE
CERTIFICATE OF CORRECTION

Patent No. 3,674,872Dated July 4, 1972

Inventor(s) Alfred Rheiner, Jr. et al.

It is certified that error appears in the above-identified patent and that said Letters Patent are hereby corrected as shown below:

No Claim for Right of Priority listed in Patent
should be

| | | |
|---|---|---|
| 1100/68 | January 24, 1968 | Switzerland |
| 4456/68 | March 26, 1968 | Switzerland |

Signed and sealed this 24th day of April 1973.

(SEAL)
Attest:

EDWARD M. FLETCHER, JR.
Attesting Officer

ROBERT GOTTSCHALK
Commissioner of Patents